United States Patent
Schreyer et al.

(10) Patent No.: US 11,965,549 B2
(45) Date of Patent: Apr. 23, 2024

(54) UNBALANCED SHAFT

(71) Applicant: Schaeffler Technologies AG & Co. KG, Herzogenaurach (DE)

(72) Inventors: Hannes Schreyer, Gerhardshofen (DE); Norbert Geyer, Höchstadt (DE); Thomas Hußenether, Nuremberg (DE); Jan Nagengast, Eggolsheim (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 469 days.

(21) Appl. No.: 17/285,607

(22) PCT Filed: Oct. 16, 2019

(86) PCT No.: PCT/DE2019/100895
§ 371 (c)(1),
(2) Date: Apr. 15, 2021

(87) PCT Pub. No.: WO2020/078512
PCT Pub. Date: Apr. 23, 2020

(65) Prior Publication Data
US 2021/0317869 A1    Oct. 14, 2021

(30) Foreign Application Priority Data
Oct. 18, 2018    (DE) .................... 10 2018 125 866.6

(51) Int. Cl.
*F16C 3/18*    (2006.01)
*F16C 19/48*    (2006.01)
(Continued)

(52) U.S. Cl.
CPC ............... *F16C 3/18* (2013.01); *F16C 19/48* (2013.01); *F16C 33/48* (2013.01); *F16C 33/585* (2013.01);
(Continued)

(58) Field of Classification Search
CPC .. F16C 3/18; F16C 19/48; F16C 33/48; F16C 33/585; F16C 2240/40; F16C 2360/18; F16F 15/267; Y10T 74/211
(Continued)

(56) References Cited

U.S. PATENT DOCUMENTS 8,132,550 B2 * 3/2012 Oishi ................ F16C 43/04
8,585,299 B2 * 11/2013 Hess ................ B21K 1/12
123/192.2
(Continued)

FOREIGN PATENT DOCUMENTS

CN    101988554 A    3/2011
CN    103069193 A    4/2013
(Continued)

*Primary Examiner* — Greg Binda

(57) ABSTRACT

An unbalanced shaft is provided that has a center of mass eccentric to its rotational axis to generate a shaft unbalance. The unbalanced shaft includes a bearing journal having a variable width throughout its circumference, and a multi-row cage having rollers which roll on inner raceways arranged on an outer lateral surface of the bearing journal. The rollers and inner raceways define a load zone, within which a width of each of the inner raceways is greater than an effective length of the rollers idling thereon. At least one of the inner raceways, which extends circumferentially for 360 degrees, has a width throughout that is greater than an effective length of the rollers rolling thereon. For sections outside of the load zone, at least one of the inner raceways has a width less than the effective length of the rollers that roll thereon.

14 Claims, 1 Drawing Sheet

(51) Int. Cl.
   *F16C 33/48*      (2006.01)
   *F16C 33/58*      (2006.01)
   *F16F 15/26*      (2006.01)
(52) U.S. Cl.
   CPC ........ *F16F 15/267* (2013.01); *F16C 2240/40* (2013.01); *F16C 2360/18* (2013.01); *Y10T 74/211* (2015.01)
(58) Field of Classification Search
   USPC ...................................... 123/192.2; 74/570.1
   See application file for complete search history.

(56) References Cited

U.S. PATENT DOCUMENTS

2007/0177837 A1   8/2007   Tisch et al.
2008/0037923 A1   2/2008   Glueck

FOREIGN PATENT DOCUMENTS

CN      106949214 A      7/2017
DE     102014210366 A1  12/2015
EP         1775484 B2    1/2016

\* cited by examiner

UNBALANCED SHAFT

CROSS-REFERENCE TO RELATED APPLICATIONS

This application is the U.S. National Phase of PCT Application No. PCT/DE2019/100895 filed on Oct. 16, 2019 which claims priority to DE 10 2018 125 866.6 filed on Oct. 18, 2018, the entire disclosures of which are incorporated by reference herein.

TECHNICAL FIELD

This disclosure relates to an unbalanced shaft having a center of mass eccentric to the rotational axis thereof and which generates the shaft unbalance.

BACKGROUND

A typical application of such an unbalanced shaft is mass balance transmissions, which compensate for free inertial forces and/or inertial moments of a reciprocating piston internal combustion engine. The shaft unbalance acts as a point load on the load zone of the bearing journal, so that the width thereof can be dimensioned to be variable according to the point load: In known bearing journals, the circumferential region opposite the load zone is either relatively narrow, or the inner raceway of the roller bearing is completely interrupted in this region with a width of zero, see for example EP 1 775 484 B2, from which the technical advantages of unbalanced shafts with variable-width bearing journals mounted on roller bearings with regard to the reduction of operational friction and weight of the unbalanced shaft can be seen.

However, a prerequisite for the complete interruption of the bearing journal is of course that it is free of operational forces in the interrupted circumferential region which also require radial bearing support in this region. Conversely, this means that the rolling bearing must also be adjusted to the radial forces acting thereon, such as transverse forces from the shaft drive acting as a circumferential load in the circumferential region outside the unbalance-induced load zone.

A generic unbalanced shaft with a fully circumferential and variable-width bearing journal and a two-row needle cage as a radial bearing is known from DE 10 2014 210 366A1. One advantage of a multi-row needle bearing, which is used in particular when the needles have a very large length-diameter ratio, is the minimization of the axial thrust from the rolling element entanglement. The longer the needles are configured to be, the more they can become entangled in operation. When a long needle is divided into several shorter needles, the entanglement thereof is smaller and thus the axial thrust in the entire needle bearing is reduced.

SUMMARY

The object of the present disclosure is to specify an unbalanced shaft with a needle bearing which is matched in a structurally advantageous manner to that loading case in which, due to the load zone unbalance, the shaft unbalance as well as a further radial force acts on the bearing journal both within the unbalance-induced load zone and outside this load zone.

According to the disclosure, this object is achieved in that the following applies fully circumferentially to the raceway width B of the fully circumferential inner raceway and the effective needle length L of the needle row rolling thereon: B>L.

The dimensioning of the raceway widths according to the disclosure means, on the one hand, that the bearing journal load acting in the unbalance-induced load zone is absorbed and transmitted jointly by all of the needle rows, and on the other hand, that the needles of the needle row rolling along the entire inner raceway are always in rolling contact with the entire effective length thereof on the fully circumferential inner raceway and consequently do not protrude above the inner raceway on either one or both sides. Their fully circumferential support of the entire effective needle length has the effect that at least the needles of this needle row roll free of edge support both within as well as in the circumferential region subject to radial force outside the unbalanced-induced load zone.

Depending on the level of the radial force that loads the bearing journal outside the unbalance-induced load zone, one or more of the inner raceways with the raceway width B=0 can be completely interrupted around the circumference. The transition between the full raceway width and the interruption can take place on the one hand with gradually decreasing raceway width. On the other hand, the inner raceways should in particular be interrupted transition-free if the inner raceways in these circumferential regions of the bearing journal are free of radial forces and consequently free of loads. The transition-free interruption is to be understood as meaning that the interrupted inner raceway—seen in the direction of rotation of the raceway interruption—ends and begins with an axially parallel edge. This also prevents wear-promoting edge supports on the needles at the beginning and at the end of the raceway break.

BRIEF DESCRIPTION OF THE DRAWINGS

Further features and designs of the disclosure result from the following description and the figures, in which an exemplary embodiment of an unbalanced shaft according to the disclosure is shown in a simple manner. In the drawings.

DETAILED DESCRIPTION OF THE EMBODIMENTS

Figure 1:
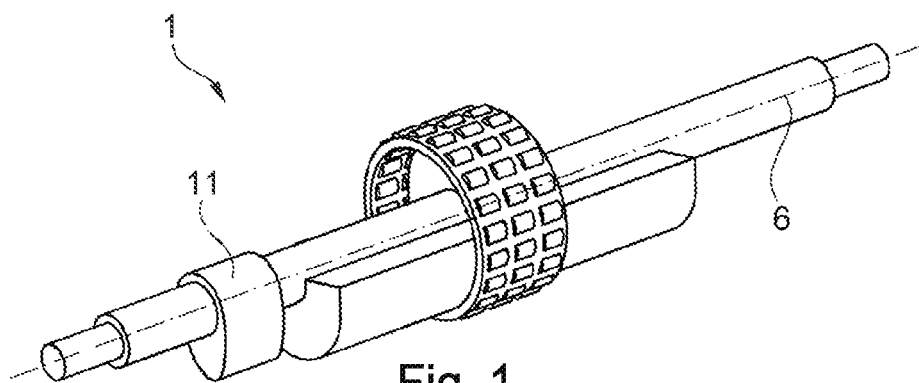
FIG. 1 shows the unbalanced shaft in a perspective view.

FIG. 1 shows an unbalanced shaft 1 of a mass balance transmission, which is used to balance the free inertial forces and inertial moments of the second order of an internal combustion engine in a four-cylinder in-line design. In this case, the mass balance transmission comprises two such unbalanced shafts 1, which rotate in opposite directions at twice the crankshaft speed. Further add-on parts, such as a chain or toothed wheel driving the unbalanced shaft 1 or a deep groove ball bearing that absorbs axial forces are missing in the simplified illustration.

Figure 2:
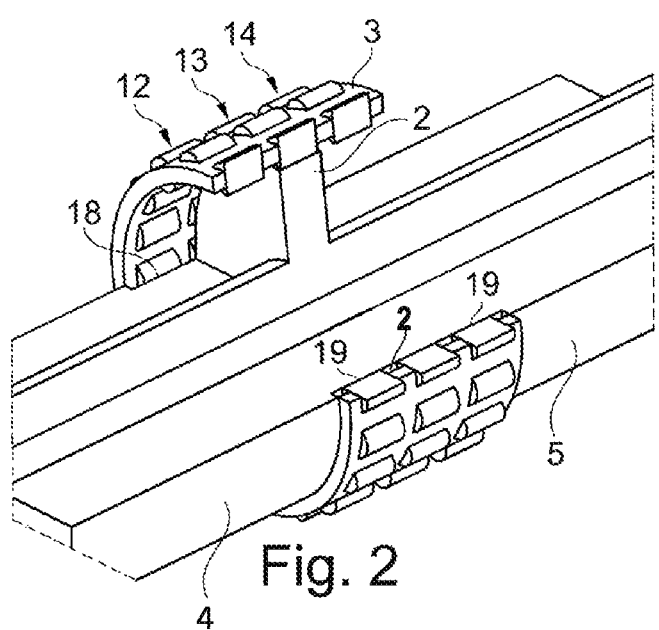
FIG. 2 shows the bearing journal of the unbalanced shaft as an enlarged detail in perspective partial section.
Figure 3:
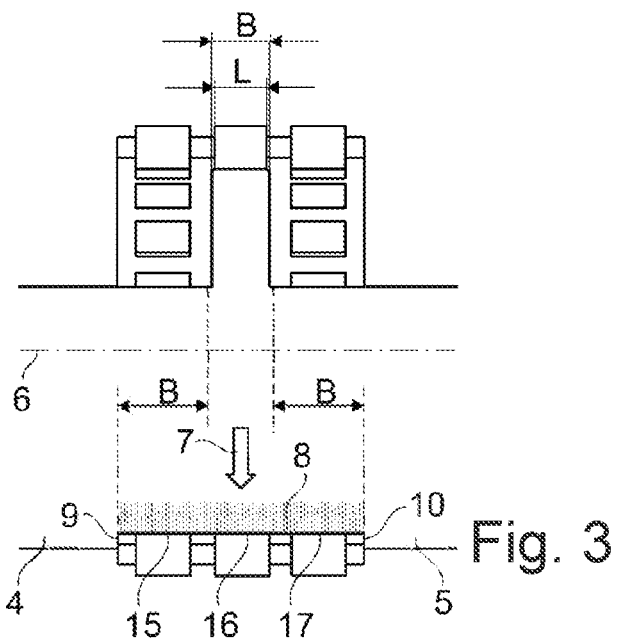
FIG. 3 shows the bearing journal as an enlarged detail in longitudinal section.

As shown enlarged in FIG. 2, the unbalanced shaft 1 has a bearing journal 2 and a multi-row needle cage 3 which surrounds the bearing journal 2 for the purpose of radial mounting. The shaft sections 4 and 5 adjoining the bearing journals 2 are designed as unbalanced sections, so that the unbalanced shaft 1 has a center of mass which is eccentric to the rotational axis 6 thereof and which generates the shaft unbalance 7. The bearing journal 2 is also involved in generating the shaft unbalance 7 in favor of the lightweight shaft construction with a circumferentially variable width and stands still relative to the shaft unbalance 7, so that it applies a point load to the bearing journal 2 in a load zone 8. The load zone 8 and the shaft unbalance 7 are indicated in FIG. 3 by the shading and the arrow. The bearing journal 2 is offset radially inward from the axial shoulders 9 and 10 of the adjacent shaft sections 4, 5, the axial shoulders 9, 10 extending over only a partial circumference of the bearing journal 2 and the load zone 8 running within this partial circumference, which is approximately 180°.

The unbalanced shaft 1 is also provided with a drive cam 11 which drives a plunger of a fuel pump (not shown) of the internal combustion engine.

The bearing journal 2 is mirror-symmetrical to an unbalanced plane that is spanned by the center of mass of the unbalanced shaft 1 and the rotational axis 6 thereof. The circumferentially variable width of the bearing journal 2 is adapted to the circumferentially variable radial force load thereof, which results from the shaft unbalance 7 and from the reaction force of the drive cam 11. The load zone 8 is significantly more heavily loaded than the diametrically opposite circumferential region of the bearing journal 2.

The needle cage 3 is configured with three rows of rollers or needles, and the structurally identical needle rows 12, 13, and 14 thereof roll on inner raceways 15, 16, and 17 which are formed directly by the outer lateral surface of the bearing journal 2. The needle cage 3 and the inner raceways 15 to 17 are mirror-symmetrical with respect to the central needle row 13 so that the needle cage 3 can be mounted in a non-directional manner.

As an alternative to the direct raceways on the bearing journal 2, the inner raceways can also run on a bearing ring which is joined to the bearing journal and has a correspondingly variable width.

The width of the bearing journal 2 is dimensioned over the entire circumferential region of the load zone 8 so that the dimensional relationship applies there for the raceway width B of each inner raceway 15 to 17 and for the effective needle length L of the needle rows 12 to 14 rolling thereon: B>L. As a result, the bearing load is transmitted in the entire circumferential region of the load zone 8 over the entire effective needle length L of all needle rows 12 to 14.

The central inner raceway 16 extends completely over 360°, wherein the dimensional relationship B>L applies fully circumferentially for the raceway width B thereof and for the effective needle length L of the needle row 13 rolling thereon. The two outer inner raceways 15 and 17 are each completely interrupted outside the load zone 8 with a raceway width B=0, so that the bearing load resulting from the reaction force of the drive cam 11 in the circumferential region of the interruption is only transferred from the central inner raceway 16 and the needle row 13 rolling thereon. The interruption of each inner raceway 15 and 17 is transition-free, i.e., the inner raceways 15 and 17 end and begin in the circumferential direction with axially parallel edges 18 and 19 on which the bearing journal 2 is load-free.

LIST OF REFERENCE SYMBOLS

1 Unbalanced shaft
2 Bearing journal
3 Needle cage
4 Shaft section
5 Shaft section
6 Rotational axis
7 Shaft unbalance
8 Load zone
9 Axial shoulder
10 Axial shoulder
11 Drive cam
12 Needle row
13 Needle row
14 Needle row
15 Inner raceway
16 Inner raceway
17 Inner raceway
18 Edge
19 Edge

The invention claimed is:

1. An unbalanced shaft having a center of mass eccentric to a rotational axis thereof which generates a shaft unbalance, the unbalance shaft comprising:
   a bearing journal having different widths through a circumference of the bearing journal, the bearing journal configured with first and second inner raceways,
   a cage having:
      a first row of rollers configured to roll on the first inner raceway, the first inner raceway having a first width greater than an effective length of the first row of rollers, and
      a second row of rollers configured to roll on the second inner raceway, the second inner raceway having a second width greater than an effective length of the second row of rollers.

2. The unbalanced shaft of claim 1, wherein the second inner raceway is axially adjacent to the first inner raceway.

3. The unbalanced shaft of claim 1, further comprising a drive cam.

4. The unbalanced shaft of claim 1, wherein the bearing journal is offset radially inward from axial shoulders of respective adjacent shaft sections arranged on each side of the bearing journal.

5. The unbalanced shaft of claim 1, wherein:
   the cage further comprises a third row of rollers and the bearing journal further comprises a third inner raceway, the third row of rollers configured to roll on the third inner raceway, and
   the third inner raceway defines: i) a third portion having a raceway width greater than an effective length of the third row of rollers, and ii) a fourth portion having a raceway width less than the effective length of the third row of rollers, and
   the first row of rollers arranged between the second and third rows of rollers.

6. The unbalanced shaft of claim 5, wherein the cage and the first, second, and third inner raceways are mirror-symmetrical with respect to the first row of rollers so that the cage can be mounted on the bearing journal non-directionally.

7. The unbalance shaft of claim 1, wherein the first width is greater than an effective length of the first row of rollers throughout a 360-degree circumference of the first inner raceway.

8. The unbalance shaft of claim 7, wherein:
   the second width is greater than an effective length of the second row of rollers throughout a first portion of the second inner raceway, and
   the second width is less than an effective length of the second row of rollers throughout a second portion of the second inner raceway.

9. An unbalanced shaft having a center of mass eccentric to a rotational axis thereof which generates a shaft unbalance, the unbalanced shaft comprising:

a bearing journal having different widths throughout a circumference of the bearing journal; and a cage having a plurality of rows of rollers configured to roll on a plurality of inner raceways arranged on an outer lateral surface of the bearing journal, the plurality of rows of rollers and plurality of inner raceways defining a load zone on an unbalance side of the unbalanced shaft; and at least one of the plurality of inner raceways extends circumferentially for 360 degrees; and within the load zone, an effective length of each one of the plurality of rows of rollers is less than a raceway width of a corresponding one of the plurality of inner raceways; and in sections outside of the load zone: i) an effective length of at least one of the plurality of rows of rollers is greater than a raceway width of a corresponding one of the plurality of inner raceways, and ii) a raceway width of the at least one of the plurality of inner raceways is greater than an effective length of a corresponding row of the plurality of rows of rollers.

10. The unbalanced shaft of claim 9, wherein at least one of the plurality of inner raceways is interrupted with a raceway width equal to zero in a section outside of the load zone.

11. The unbalanced shaft of claim 10, wherein an end of the at least one of the plurality of inner raceways is defined by an axially extending edge parallel to the rotational axis of the unbalance shaft.

12. The unbalanced shaft of claim 9, wherein the unbalanced shaft has a drive cam.

13. The unbalanced shaft of claim 9, wherein the cage has three rows of rollers.

14. The unbalanced shaft of claim 13, wherein the cage and the plurality of inner raceways are mirror-symmetrical with respect to a central row of rollers.

\* \* \* \* \*